United States Patent [19]
Lauzon et al.

[11] Patent Number: 6,130,973
[45] Date of Patent: Oct. 10, 2000

[54] METHOD AND APPARATUS FOR SPECTRALLY DESIGNING ALL-FIBER FILTERS

[75] Inventors: Jocelyn Lauzon, St-Augustin-de-Desmaures; Martin Guy, Cap Rouge; Yves Painchaud, Sainte-Marie; Martin Pelletier, Saint-Jean-Chrysostome, all of Canada

[73] Assignee: Institut National D'Optique, Sainte-Foy, Canada

[21] Appl. No.: 09/048,698

[22] Filed: Mar. 26, 1998

[51] Int. Cl.[7] .................................................. G02B 6/34
[52] U.S. Cl. .......................................... 385/37; 430/290
[58] Field of Search ............................... 385/37; 430/290

[56] References Cited

U.S. PATENT DOCUMENTS

| | | | |
|---|---|---|---|
| 5,367,588 | 11/1994 | Hill et al. | 385/37 |
| 5,604,829 | 2/1997 | Bruesselbach | 385/37 |
| 5,619,603 | 4/1997 | Epworth et al. | 385/37 |
| 5,620,495 | 4/1997 | Aspell et al. | 65/392 |
| 5,633,966 | 5/1997 | Nakaishi | 385/37 |
| 5,694,502 | 12/1997 | Byron | 385/37 |
| 5,745,615 | 4/1998 | Atkins et al. | 385/37 |
| 5,745,617 | 4/1998 | Starodubov et al. | 385/37 |
| 5,832,154 | 11/1998 | Uetsuka et al. | 385/37 |
| 5,848,207 | 12/1998 | Uetsuka et al. | 385/37 |
| 5,912,999 | 6/1999 | Brennan, III et al. | 385/37 |
| 5,945,261 | 8/1999 | Rourke | 430/321 |

OTHER PUBLICATIONS

Loh et al., "Complex grating structures with uniform phase masks based on the moving fiber–scanning beam technique", Optics Letters, vol. 20, No. 20, pp.2051 2053, Oct. 1995.

Martin et al., "Novel writing technique of long and highly reflective in–fibre gratings", Electronicd Letters, vol. 30, No. 10, pp. 811–812, May 1994.

Cole et al., "Moving fibre/phase mask–scanning beam technique for enhances flexibility in producing fibre gratings with uniform phase mask", Electronics Letters, vol. 31, No. 17, pp. 1488–1490, Aug. 1995.

Primary Examiner—John D. Lee
Assistant Examiner—Michelle R. Connelly-Cushwa
Attorney, Agent, or Firm—Merchant & Gould P.C.

[57] ABSTRACT

A method and an apparatus to photoinduce a grating or other type of modulated refractive index change in a photosensitive optical medium such as optical fiber. The resulting grating has a variable and controllable intensity profile and average value of the index change. The modulated refractive index change is photoimprinted in the medium in a series of writing steps, each comprising exposing a segment of the medium to a writing beam for a predetermined exposure time. To change the modulation intensity from step to step, the angle of incidence of the writing beam is dithered for an appropriate fraction of the exposure time at each step. This allows to control the amount of incident light on the medium for each step. If the exposure time is the same for each writing step, the average value of the index change may be kept constant avoiding undesired structure in the grating frequency response.

11 Claims, 6 Drawing Sheets

(PRESENT INVENTION)

METHOD AND APPARATUS FOR SPECTRALLY DESIGNING ALL-FIBER FILTERS

BACKGROUND OF THE INVENTION a) Field of the Invention

The present invention belongs to the field of photoinduced gratings in optical media, and more particularly relates to a method and an apparatus for photoinducing gratings having a spatially variable and controllable diffraction efficiency and average local index change.

b) Brief Description of Prior Art

It is now well established that Wavelength Division Multiplexing (WDM) systems using Erbium Doped Fiber Amplifiers (EDFA) will be the next enabling technology to access the huge optical fiber bandwidth. In those type of systems, all-fiber wavelength selective devices such as bandpass filters, gain flattening filters for EDFAs, dispersion compensators, and filters with any spectral shape and fine tuning of the nominal wavelength of Bragg gratings will be required.

Photosensitivity in optical fiber can be used to fabricate wavelength selective devices, since it allows to change the refractive index in the core of the optical fiber. This is done by illuminating the core with UV light. Such refractive index change is permanent and can be successfully used to fabricate Bragg gratings to act as bandpass filters, chirped Bragg gratings to make dispersion compensators, and spectrally designed all-fiber filters.

FIGS. 1a to 1f (identified as "prior art") illustrate various types of modulated refractive index changes and their resulting reflectivity responses. It is well known that Bragg gratings having a uniform index modulation 7, as shown in FIG. 1a, exhibit sidelobes 9 on both sides of the main reflection peak 11 (FIG. 1b). Those sidelobes 9 are undesirable because they induce crosstalk between adjacent channels in WDM systems. It has been shown that those sidelobes can be suppressed if the coupling efficiency varies spatially along the grating length, as illustrate in FIGS. 1c and 1d. This operation, called apodization, is ideally achieved by photoimprinting an index change amplitude modulation 13 that has a bell-like shape along the grating length. However, such apodized gratings present a fine structure 15 on the short wavelength side of their reflection response and lead to an undesirable chirp of the Bragg wavelength. The variation of the average index change causes the local Bragg wavelength at the center of the grating to be longer than the local Bragg wavelength at both ends; the grating then acts as a Fabry-Perot cavity. In order to get rid of those short wavelength resonances, the average refractive index has to be compensated so that the Bragg resonance is uniform along the whole grating length. FIGS. 1e and 1f show an example of the shape such a refractive index change 17 might take, and the resulting dispersion-free reflective response.

A number of techniques have been developed to produce gratings having a constant refractive index change. For example, a double exposure method is disclosed in MALO, B. et al.,"Apodised in-fiber Bragg grating reflectors photo-imprinted using a Phase Mask", Electronics Letters, vol 31, no 3, pp. 223–225 (1995). As implied by its name, this technique requires that the optical medium be exposed to the writing light twice: once to produce the modulated refractive index change, and another time with a shadow mask to compensate for nonuniform variations in the average index. Phase masks with a locally varying diffraction efficiency have also been developed (see ALBERT, J. et al., "Apodisation of the Spectral Response of Fiber Bragg Gratings using a Phase Mask with Variable Diffraction Efficiency", Electronics Letters, vol 31, no 3, pp 222–223 (1995)), and systems to move the fiber and phase mask during the exposure have been proposed for pure apodization. In one such system described in COLE, M. J. et al., "Moving Fiber/Phase Mask-Scanning Beam Technique for Enhanced Flexibility in Producing Fiber Gratings with Uniform Phase Mask", a small dither is applied to the optical fiber while the phase mask is kept fixed. If the magnitude of the dither is half of a grating pitch, the net result is a DC index change. If apodization is required, the magnitude of the dither is changed accordingly along the exposed fiber length. However, because the fiber is dithered, this writing system is very sensitive to external perturbations.

Although the above-mentioned techniques usually produce very good apodized gratings, they require some post-processing, sophisticated phase masks or elaborate setups, making them unpractical for large-scale production. There is therefore a need for a simple and flexible technique to photoinduce apodized Bragg gratings or spectrally designed filters in optical fibers or other types of optical waveguides, while allowing to control at will the average index change over all the UV exposed region.

OBJECT AND SUMMARY OF THE INVENTION

Accordingly, an object of the present invention is to provide a simple and flexible method to photoinduce a modulated refractive index change in an optical medium.

Another object of the present invention is to provide such a method which produces a refractive index change having both a variable intensity profile and a controlled average value.

Yet another object of the present invention is to provide such a method that does not require post-processing, sophisticated phase mask or elaborate setups.

A further object of the present invention is to provide an apparatus for implementing said method.

More particularly, the present invention provides a method to photoinduce a modulated refractive index change in a length of an optical medium. The optical medium is photosensitive and has at least one waveguiding axis. The modulated refractive index change has both a variable intensity profile and a controlled average value along the waveguiding axis. The method comprises steps of:

performing consecutive writing steps, each of the writing steps having an exposure time selected to generate the controlled average value of the modulated refractive index change, each writing step comprising substeps of:

a) exposing for the entire exposure time a segment of the optical medium to a writing radiation beam having an angle of incidence on the segment of the optical medium that is generally perpendicular to the waveguiding axis, the writing radiation beam also having an interference pattern generated therein to produce the modulated refractive index change; and b) dithering the angle of incidence of the writing radiation beam for a fraction of the exposure time to blur the interference pattern and partially replace the modulated refractive index change by a DC refractive index change, the fraction of the exposure time being selected for each writing step to define the variable intensity profile of the modulated refractive index change;

translating the optical medium along the waveguiding axis between each writing step to expose a different segment of the optical medium at each writing step; and performing a sufficient number of writing steps and translating steps to cover the length of the optical medium.

The present invention also provides an apparatus for photoinducing a modulated refractive index change in a length of an optical medium, the optical medium being photosensitive and having at least one waveguiding axis. The modulated refractive index change has a variable intensity profile and a controlled average value along the waveguiding axis.

The apparatus comprises an optical source for producing a writing radiation beam, the writing radiation beam being directed on the optical medium at an angle of incidence generally perpendicular to the waveguiding axis. The apparatus additionally comprises modulating means for generating an interference pattern in the writing radiation beam. The interference pattern generates the modulated refractive index change in the optical medium. Controllable dithering means are also comprised, for dithering the angle of incidence of the writing radiation beam. The dithering blurs the interference pattern and partially replaces the modulated refractive index change by a DC refractive index change. The apparatus further comprises controllable translating means, for translating the optical medium along the waveguiding axis.

Advantageously, the present invention may be used to produce a number of wavelength selective devices, such as bandpass filters, dispersion compensators or spectrally designed all-fiber filters. No post-processing needs to be performed, and sophisticated phase masks or elaborate set-ups are not necessary. The method described herein may be fully automated, and produces pure apodization.

The present invention and its advantages will be better understood upon reading the following non restrictive description of a preferred embodiment thereof, made with reference to the accompanying drawings.

BRIEF DESCRIPTION OF THE DRAWINGS

FIGS. 1a and 1b concern a uniform index change, FIGS. 1c and 1d an apodized index change, and 1e and 1f an apodized index change of uniform average value;

DESCRIPTION OF A PREFERRED EMBODIMENT OF THE INVENTION

Figure 1:
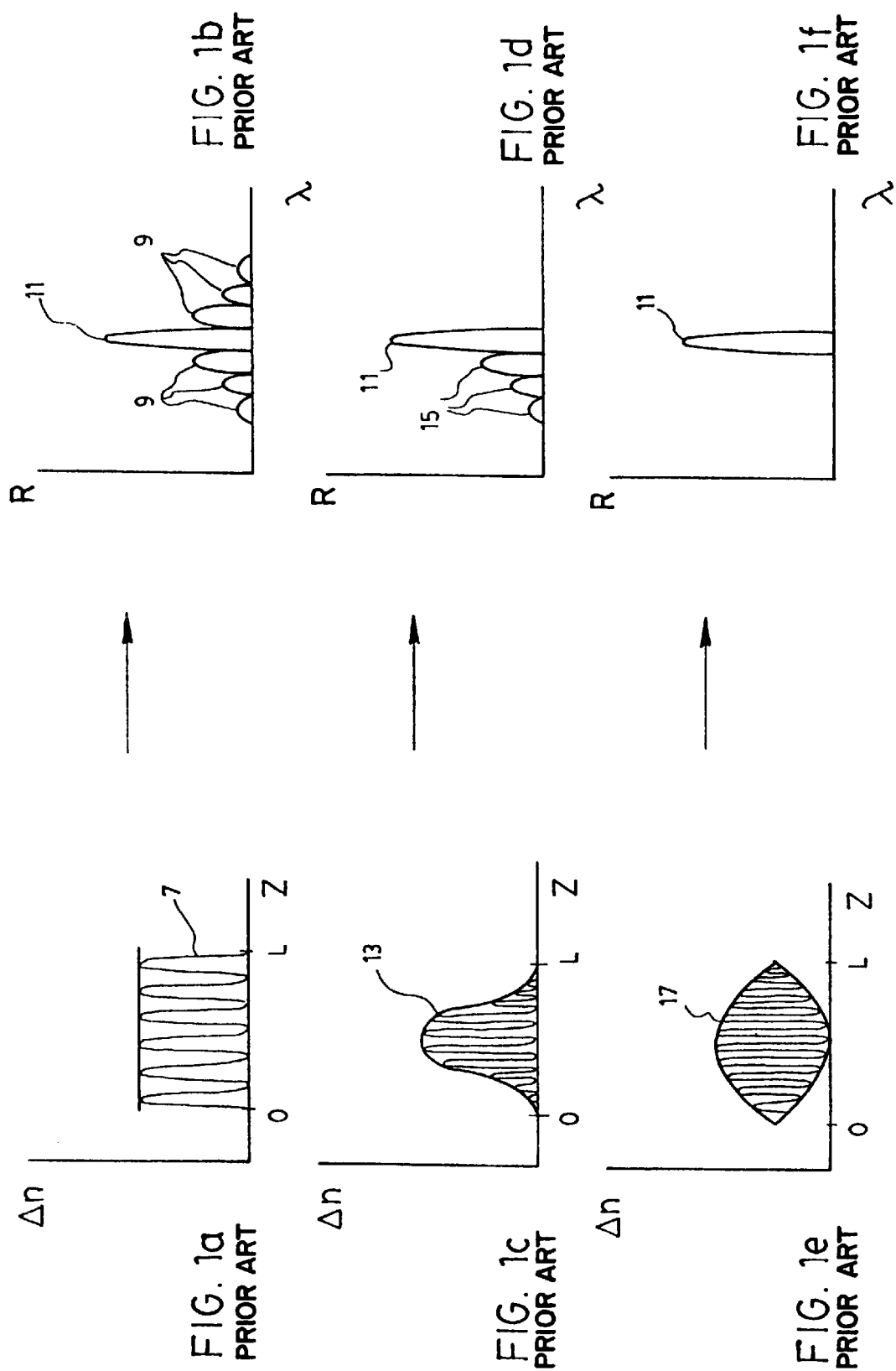
FIGS. 1a to 1f (prior art) are graphic representations of modulated refractive index changes and the corresponding reflectivity response of the medium.

According to the present invention, a method to photoinduce a modulated refractive index change in a length of an optical medium is provided. In the preferred embodiment described hereinafter, optical fiber is the optical medium of choice, but it should be understood that the present method could be applied to photoimprint a refractive index change in other types of waveguiding medium, as long as it exhibits photosensitive characteristics.

The present method allows to produce a modulated refractive index change having both a variable intensity profile and a controlled average value along the waveguiding axis of the optical medium. The method comprises performing a series of consecutive writing steps, each having a predetermined exposure time. In a preferred embodiment of the invention wherein a constant average value of the modulated refractive index change is desired, the chosen exposure time is the same for all the writing steps. In this manner, the amount of writing radiation incident on the optical medium is also the same for each writing step, which ensures that the average value of the modulated refractive index change is constant throughout the exposed region.

Each writing step comprises a first substep a) of exposing for the entire exposure time a segment of the optical medium to a writing radiation beam. The writing radiation beam has an angle of incidence on the segment of the optical medium generally perpendicular to the waveguiding axis, and has an interference pattern generated therein to produce the modulated refractive index change. This interference pattern is generally generated by a phase mask disposed in the path of the optical writing beam, proximate the optical medium. Phase masks are fairly common tools in the manufacture of Bragg gratings in optical fiber. They are usually designed to maximize the contrast of the −1 and +1 diffraction orders which, when superposed, generate interference fringes constituting the required interference pattern. For this condition to be realized, the depth of the grooves of the phase mask must be chosen to correspond to an optical path difference of $\pi$ radians at the wavelength of the writing beam. It is possible to modify the groove depth or width or the period of the mask grating to locally change the fringe contrast and therefore the properties of the photoinduced refractive index change, but, for the present invention, no sophisticated design is necessary; a uniform phase mask is sufficient to realize the method described herein.

Each writing step comprises a second substep b) of dithering the angle of incidence of the writing radiation beam for a fraction of the exposure time. The effect of this dithering is to blur the interference pattern photoinduced in the optical medium. The net result is to partially replace the modulated refractive index change by a DC refractive index change. In this manner, by choosing an appropriate fraction of the exposure time during which the writing beam is dithered for each writing step, any profile of both the intensity of the modulated refractive index change and its average value may be defined independently. Of course, the fraction of the exposure time may have any value between 0 and 1, depending on the desired result of each independent step. To generate an apodized Bragg grating, each step is given the same exposure time to keep the average index change constant and a bell-like shape is preferably given to the intensity profile by a judicious choice of the fraction of this time during which the writing beam is dithered. Various other forms may be given to the intensity profile in view of the desired filtering effect of the resulting structure.

The method according to the present invention also comprises translating the optical medium along the waveguiding axis between each writing step, to each time expose a different segment of the optical medium. Long gratings can therefore be manufactured in the optical medium. If a phase mask is provided to generate the interference pattern, then the method preferably comprises translating the phase mask jointly with the optical medium.

The method finally comprises performing a sufficient number of writing steps and translating steps to cover the length of the optical medium.

Figure 2:
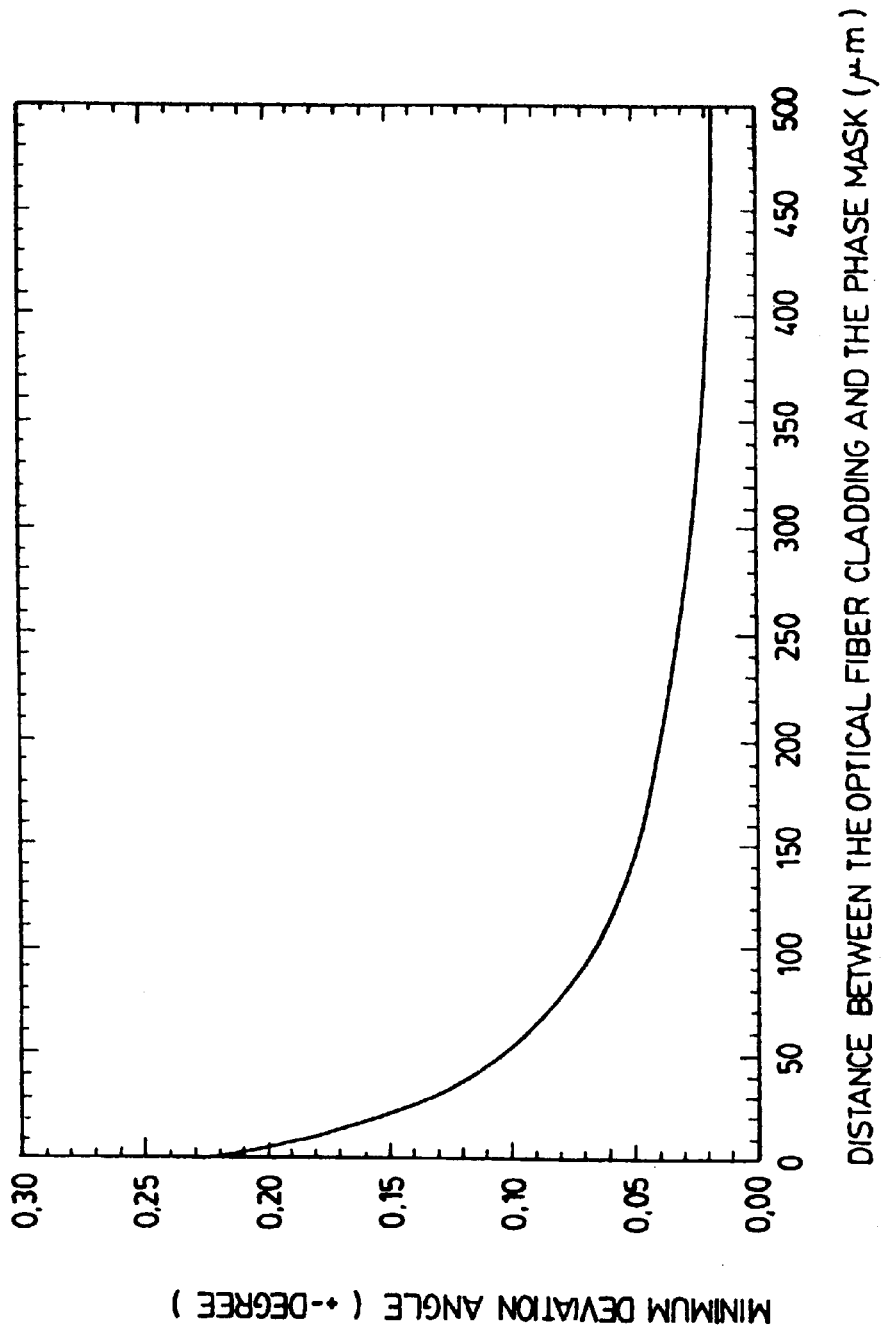
FIG. 2 is a graphic representation of the variation of the minimum deviation angle of the dithering with respect to the distance between the phase mask and the optical fiber, when use is made of an apparatus according to the present invention.

The dithering of the writing radiation beam of substep b) may be simply realized by providing a mirror in the path of the writing beam, and giving this mirror a small oscillatory movement when required. Preferably, the writing beam is given a movement equal to or greater than a minimum deviation angle $\theta_{min}$. For a grating photoinduced in an optical fiber with the help of a phase mask, $\theta_{min}$ may be defined in degrees by the equation:

$$\theta_{min} = \pm \frac{\lambda \cdot 180}{4\pi \cdot n_0} \left[ \frac{d_1}{n_1} + \frac{d_2}{n_2} \right]^{-1}$$

where $\Lambda$ is a pitch of the phase mask, $n_0$, $n_1$, and $n_2$ are respectively refractive indices of the phase mask, the air and the fiber cladding, $d_1$ is the distance between the phase mask and the fiber and $d_2$ is the radius of the fiber cladding. A dithering according to this deviation angle allows to completely blur the fringes of the interference pattern, therefore generating a DC component in the index change in the fiber. For standard communication fiber and a phase mask pitch of 1 $\mu$m, appropriate for a writing radiation beam as for example produced by a Q-switched Nd:YAG laser quadrupled at 266 nm, the minimum deviation angle with respect to the distance $d_1$ between the phase mask and the fiber is shown in FIG. 2. For a phase mask held in contact with the fiber (d1=0), this angle is about ±0.23°. Of course, the deviation angle of the dithering should not be increased unnecessarily to avoid exposure of a segment of fiber adjacent to the one targeted by the current writing step.

Figure 3:
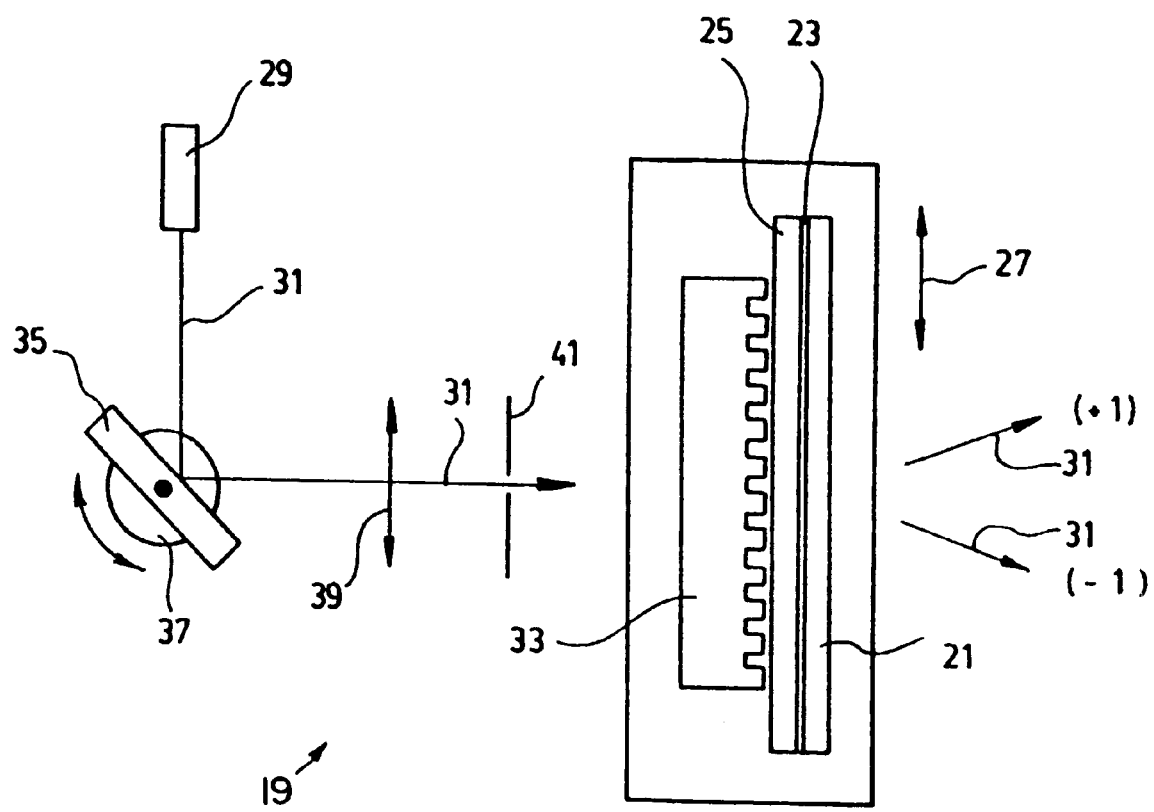
FIG. 3 is a schematic view of an apparatus used to photoinduce a modulated refractive index change in an optical fiber according to the present invention.

The present invention concerns both the above-mentioned method and an apparatus 19 to perform it. An example of such an apparatus 19 is shown in FIG. 3. The optical medium in which a modulated refractive index change is to be induced is an optical fiber 21, having a core 23 and a fiber cladding 25. Light is to be guided inside the fiber 21 according to a waveguiding axis 27.

The apparatus 19 first comprises an optical source 29, which produces a writing radiation beam 31. The holographic writing process requiring a coherent beam of light, the source 29 is preferably a laser source. The writing radiation beam 31 is directed on the fiber 21 at an angle of incidence generally perpendicular to the waveguiding axis 27, as shown in FIG. 3.

Modulating means are also provided in the apparatus 19, for generating an interference pattern in the writing radiation beam 31. This interference pattern generates the modulated refractive index change in the optical fiber 21. In the preferred embodiment of FIG. 3, the modulation means comprise a phase mask 33 in proximity of the fiber 21, and oriented generally parallel to the waveguiding axis 27. As explained above, a simple uniform phase mask is appropriate for use in the present apparatus.

The apparatus 19 according to the present invention additionally comprises controllable dithering means for dithering the angle of incidence of the writing radiation beam 31 on the optical fiber 21. With the phase mask 33 or other modulation means in the path of the writing radiation beam 31, the effect of the dithering of angle of incidence of the beam 31 is to blur the interference pattern, and partially replace the modulated refractive index change by a DC refractive index change. In this manner, the amount of radiation incident on the optical fiber 21 may be controlled independently of the modulation pattern.

The controllable dithering means preferably comprises a mirror 35, disposed in a path of the optical writing beam 31. This mirror 35 is preferably mounted on a galvanometer 37, which is modulated when the dithering is required. A motorized rotation stage or any other device allowing a controlled oscillatory movement may also be used. Additional optical elements may be provided as a matter of course, for example a cylindrical lens 39 to focus the writing radiation beam and a slit 41 to limit the beam width.

The apparatus 19 further comprises controllable translating means, for translating the optical fiber 21 along the waveguiding axis 27. In this manner, the optical fiber 19 may be exposed to the writing radiation beam 31 only a segment at a time. When a phase mask is comprised, as is the case in the embodiment of FIG. 3, this phase mask 33 is preferably translatable by the translating means jointly with the optical fiber 21.

As a demonstration of the present invention, two apodized fiber gratings were realized in optical fiber, using respectively a prior art technique and the above-described method and apparatus. For both gratings, a Q-switched Nd:YAG laser quadrupled at 266 nm was used as an optical source, producing 7 ns pulses of 2 mJ at a 5 Hz repetition rate. The interference pattern was generated by a uniform phase mask having a pitch of about 1 $\mu$m held at a distance of 50 $\mu$m from the fiber. In both cases the optical fiber was of a standard type used in telecommunications, having a cladding radius of 62.5 $\mu$m. It has a high $GeO_2$ content and was previously sensitized by high pressure hydrogen loading.

The prior art grating was written by translating step-by-step the assembly formed by the optical fiber and the uniform phase mask in front of the UV writing beam. For each step, the exposure time was set in order to have an index change amplitude modulation having a bell-like shape. The total light intensity incident on the fiber is therefore different from one step to the other. The total length of the grating is 2.75 mm, written with 125 $\mu$m long steps.

The second grating was photoinduced using the same laser source and phase mask, but this time the method according to the present invention was applied. Each writing step was performed for the same exposure time of 1 minute. A UV mirror mounted on a galvanometer was provided in the path of the writing beam, and this mirror was dithered for an appropriate fraction of the exposure time at each step to give the index change amplitude modulation a bell-like shape. The dithering deviation angle was of about ±0.1°, which is sufficient to completely blur the interference fringes as suggested by FIG. 2 for d1~50 $\mu$m. Each step was once again 125 $\mu$m long, and the resulting grating is also of 2.75 mm.

Figure 4A:
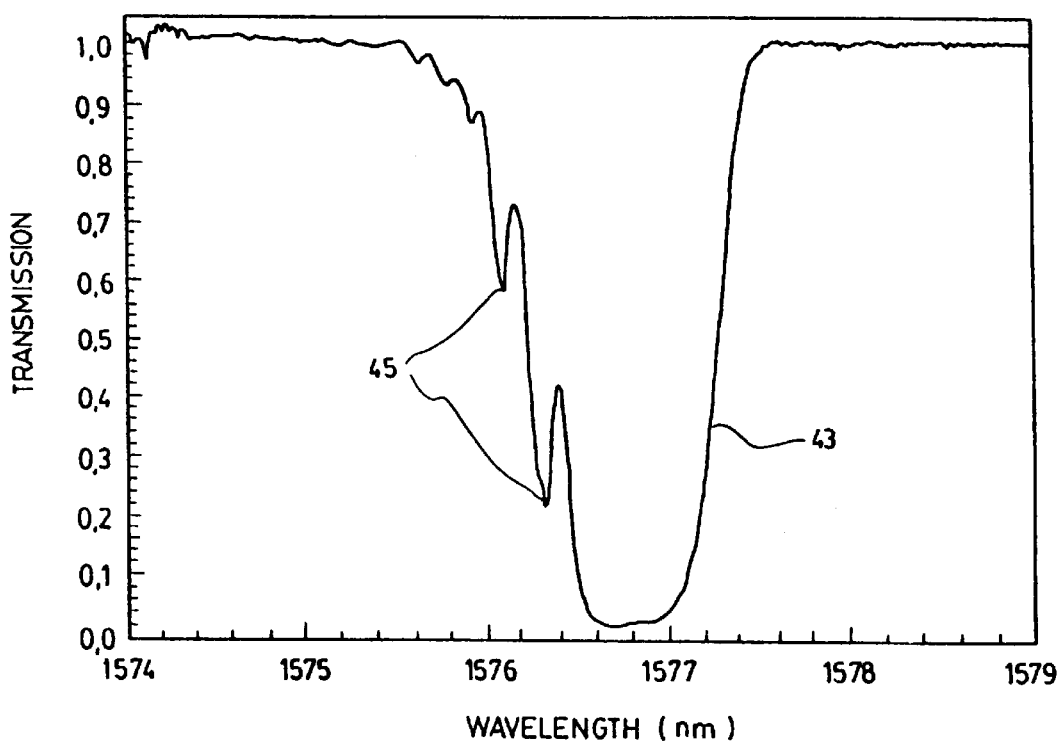
FIG. 4a is a graphic representation of the transmission of a Bragg grating fabricated according to prior art.
Figure 4B:
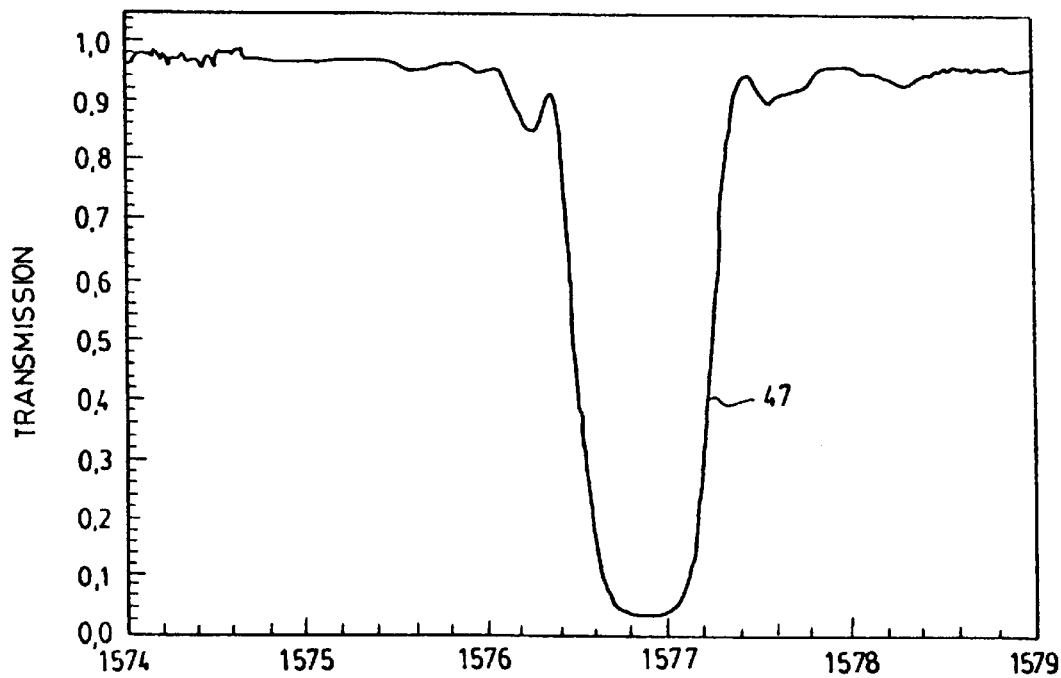
FIG. 4b is the same for a grating fabricated according to the present invention.

FIGS. 4a and 4b show the transmission characteristics for the respective resulting gratings. For the prior art method as evident from FIG. 4a, the grating has a transmission peak 43 having full width at half maximum of 1.1 nm, agreeing with the predicted value in these conditions. As expected, an undesirable fine structure 45 is apparent on the short wavelength side, associated with the non-uniform average value of the index change. On FIG. 4b, it can be seen that the grating photoinduced according to the present invention has a smaller transmission peak 47 of full width at half maximum equal to 0.71 nm, also in agreement with predicted values. The features of FIG. 4a associated with the non-uniform average value of the index change have almost vanished. Those results clearly demonstrate that the present invention allows to greatly improve the frequency response of Bragg gratings.

Figure 5:
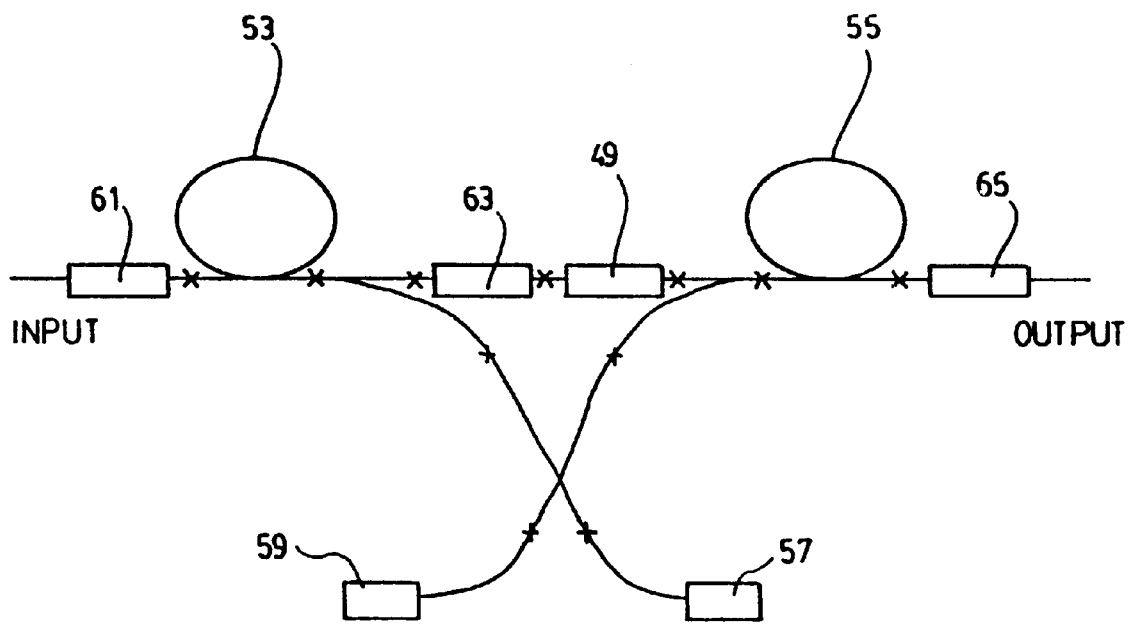
FIG. 5 is a schematic view of an apparatus comprising an optical medium wherein a refractive index change according to the present invention may be applied.

To show the flexibility of the method according to the present invention, it was used to spectrally design gain-flattening filters which could be incorporated in the middle of a two-stages EDFA, such as shown in FIG. 5. It comprises a gain flattening filter 49 as designed with the present technique, photoinduced in an optical fiber between the two stages 53 and 55 of the Erbium-doped fiber amplifier. Both fiber sections 53 and 55 are pumped by appropriate pumping sources 57 and 59. Isolators 61, 63 and 65 are provided. This amplifier configuration can be designed to optimize simultaneously the gain, noise figure and saturation output power even if a lossy element is inserted between the two stages.

In accordance with the present invention, the filter 49 is written by translating discretely a phase mask and optical fiber assembly in front of a UV writing beam, with translation steps of 400 $\mu$m. For this particular application, a chirped phase mask is used. With this phase mask, a particular position corresponds to a particular wavelength photoinduced. The writing source was the same as previously described. For each step, the total exposure time was of 30 seconds and when a DC index change was required, proportional dithering of the writing beam was performed. The same amount of radiation thus reaches the fiber core at all times so that the average index is kept constant all along the grating length. The linearly chirped phase mask used has a period of 1.0659 $\mu$m and a chirp of 11.6 nm/cm. The fiber wherein the grating was photoimprinted has a high $GeO_2$ content and was previously sensitized by high pressure hydrogen loading at 100 atm for 10 days. The total length of the grating is about 2 cm.

Figure 6A:
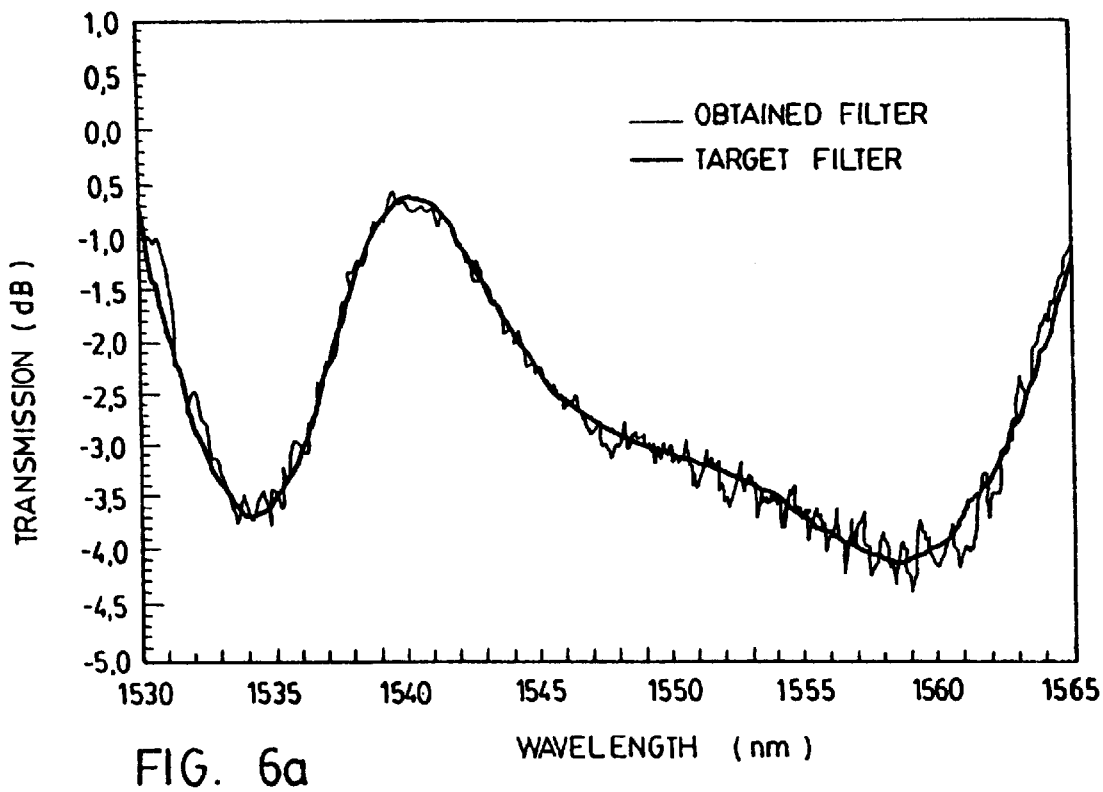
FIGS. 6a and 6b are graphic representations of the response of a gain flattening filter fabricated according to the present invention, before and after packaging and thermal annealing.

The shape of the target filter is presented in FIG. 6a, and takes into account the fact that the obtained filter will be subsequently packaged and thermally annealed. This shape has been obtained by considering the gain of the EDFA in a certain WDM configuration, which includes such factors as the number of channels, input power and the channel spectral distribution.

The grating was written using a multilayer approach, that is with multiple passes. This approach is advantageous to control in real-time the writing process. FIG. 6a shows the obtained filter before packaging and thermal annealing were performed. This filter is accurate within ±0.25 dB from 1530 to 1565 nm. The small ripples observed in the experimental data are caused by the step-by-step writing process which creates small discontinuities along the grating length. In a chain of cascade optical amplifiers, those ripples will not cause any dispersion penalty because no correlation is observed from one grating to another.

Figure 6B:
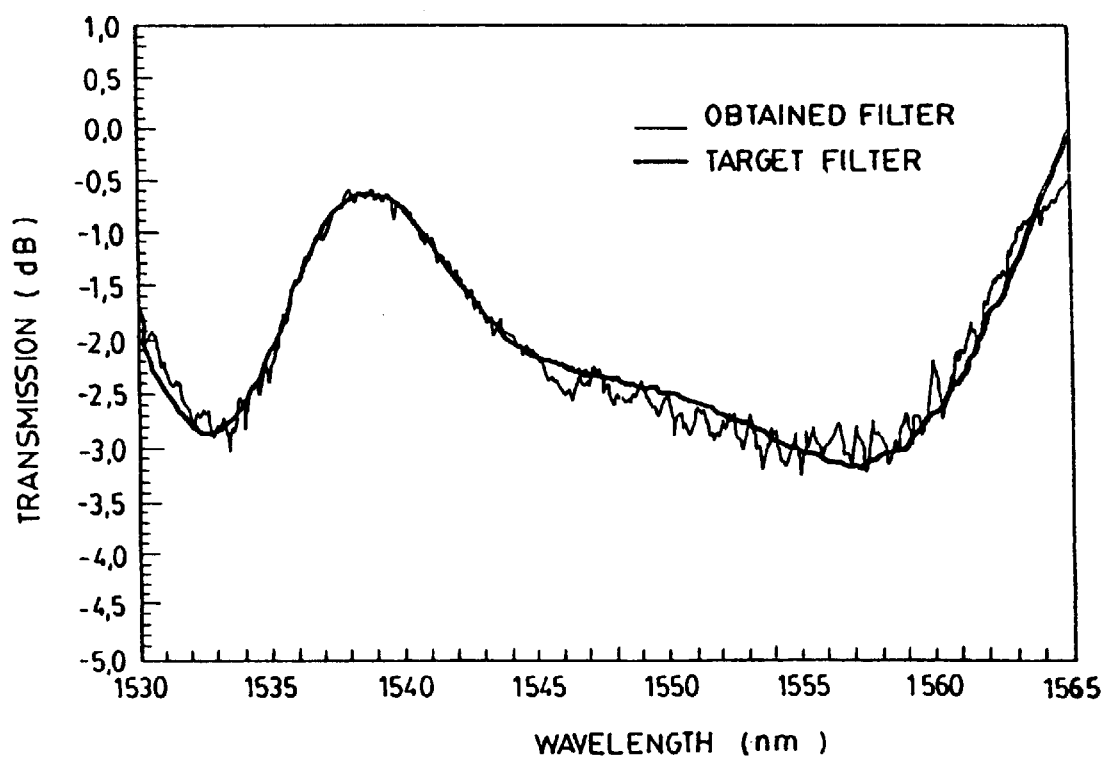

FIG. 6b shows the same filter after packaging and thermal annealing for 8 hours at 100° C. As can be seen, the packaging and annealing processes can be well controlled so that the obtained filter is still kept within ±0.25 dB of the targeted values from 1530 to 1565 nm.

As amply illustrated hereinabove, the method according to the present invention is a simple and flexible technique to spectrally design fiber Bragg gratings. This technique does not require post-processing, sophisticated phase mask or elaborate setups, and can be fully automated. Pure apodization without any Fabry-Perot effects may be achieved. Moreover, if a means to broaden the frequency response of the grating is used, such as a linearly chirped phase mask, all-fiber filters with any spectral shape can be designed. In the above-presented example of such a filter, the wavelength range covered was only limited by the length of the available linearly chirped phase mask. Finally, with minor modifications, the present method could also be implemented with other types of fiber grating writing techniques, such as two-beam interferometric exposure.

Of course, numerous modifications could be made to the preferred embodiment disclosed hereinabove without departing from the scope of the invention as defined in the appended claims.

What is claimed is:

1. A method to photoinduce a modulated refractive index change in a length of an optical medium, the optical medium being photosensitive and having at least one waveguiding axis, the modulated refractive index change having a variable intensity profile and a controlled average value along the waveguiding axis, the method comprising steps of:

performing consecutive writing steps, each of the writing steps having an exposure time selected to generate the controlled average value of the modulated refractive index change, each writing step comprising substeps of:
   a) exposing for the entire exposure time a segment of the optical medium to a writing radiation beam having an angle of incidence on the segment of the optical medium that is generally perpendicular to the waveguiding axis, the writing radiation beam also having an interference pattern generated therein to produce the modulated refractive index change; and
   b) dithering the angle of incidence of the writing radiation beam for a fraction less than 1 of the exposure time to blur the interference pattern and partially replace the modulated refractive index change by a DC refractive index change, the fraction of the exposure time being selected for each writing step to define the variable intensity profile of the modulated refractive index change;

translating the optical medium along the waveguiding axis between each writing step to expose a different segment of the optical medium at each writing step; and performing a sufficient number of writing steps and translating steps to cover the length of the optical medium.

2. A method as claimed in claim 1, wherein the optical medium is an optical fiber having a fiber cladding.

3. A method as claimed in claim 2, wherein substep a) of each writing step comprises providing a phase mask proximate the optical medium and generally parallel to the waveguiding axis, the phase mask generating the interference pattern.

4. A method as claimed in claim 3, wherein substep b) of each writing step comprises dithering the angle of incidence of the writing beam according to a deviation angle equal to or greater than a minimum deviation angle $\theta_{min}$ given in degrees by the equation:

$$\theta_{min} = \pm \frac{\lambda \cdot 180}{4\pi \cdot n_0} \left[ \frac{d_1}{n_1} + \frac{d_2}{n_2} \right]^{-1}$$

where $\kappa$ is a pitch of the phase mask, $n_0$, $n_1$ and $n_2$ are respectively refractive indices of the phase mask, the air and the fiber cladding, $d_1$ is a distance between the phase mask and the fiber and $d_2$ is a radius of the fiber cladding.

5. A method as claimed in claim 1, wherein, in substep b) of each writing step, the fraction of the exposure time for each writing step is selected so as to give the variable intensity profile of the modulated refractive index change a bell-like shape.

6. A method to photoinduce a modulated refractive change in a length of an optical medium, the optical medium being photosensitive and having at least one waveguiding axis, the modulated refractive index change having a variable intensity profile and a controlled average value along the waveguiding axis, the method comprising steps of;

performing consecutive writing steps, each of the writing steps having an exposure time selected to generate the controlled average value of the modulated refractive index change, each writing step comprising substeps of;
        a) exposing for the entire exposure time a segment of the optical medium to a writing radiation beam having, an angle of incidence on the segment of the optical medium that is generally perpendicular to the waveguiding axis, the writing radiation beam also having an interference pattern generated therein to produce the modulated refractive index change; and
        b) dithering the angle of incidence of the writing radiation beam for a fraction less than 1 of the exposure time to blur the interference pattern and partially replace the modulated refractive index change by a DC refractive index change, the fraction of the exposure time being selected for each writing step to define the variable intensity profile of the modulated refractive index change;
    translating the optical medium along the waveguiding axis between each writing step to expose a different segment of the optical medium at each writing step; and
    performing a sufficient number of writing steps and translating steps to cover the length of the optical medium;
    wherein said substep a) comprises providing a phase mask proximate the optical medium and generally parallel to the waveguiding axis, the phase mask generating the interference pattern; and
    wherein each translating step comprises translating the phase mask jointly with said optical medium.

7. A method to photoinduce a modulated refractive index change in a length of an optical medium, the optical medium being photosensitive and having at least one waveguiding axis, the modulated refractive index change having a variable intensity profile and a controlled average value along the waveguiding axis, the method comprising steps of:

performing consecutive writing steps, each of the writing steps, having an exposure time selected to generate the controlled average value of the modulated refractive index change, each writing step comprising subsets of:
        a) exposing for the entire exposure time a segment of the optical medium to a writing radiation beam having an angle of incidence on the segment of the optical medium that is generally perpendicular to the waveguiding axis, the writing radiation beam also having an interference pattern generated therein to produce the modulated refractive index change; and
        b) dithering the angle of incidence of the writing radiation beam for a fraction less than 1 of the exposure time to blur the interference pattern and partially replace the modulated refractive index change by a DC refractive index change, the fraction of the exposure time being selected for each writing step to define the variable intensity profile of the modulated refractive index change;
    translating the optical medium along the waveguiding axis between each writing step to expose a different segment of the optical medium at each writing step; and
    performing a sufficient number of writing steps and translating steps to cover the length of the optical medium;
    wherein substep b) of each writing step comprises providing a mirror in a path of the writing radiation beam and dithering said mirror to generate the dithering of the angle of incidence of the writing radiation beam.

8. An apparatus for photoinducing a modulated refractive index change in a length of an optical medium, the optical medium being photosensitive and having at least one waveguiding axis, the modulated refractive index change having a variable intensity profile and a controlled average value along the waveguiding axis, the apparatus comprising:

an optical source for producing a writing radiation being, said writing radiation beam being directed on the optical medium at an angle of incidence generally perpendicular to the waveguiding axis;
    modulating means for generating an interference pattern in the writing radiation beam the interference pattern generating the modulated refractive index change;
    controllable dithering means for dithering the angle of incidence of the writing radiation beam to blur the interference pattern and partially replace the modulated refractive index change by a DC refractive index change; and
    controllable translating means for translating the optical medium along the waveguiding axis,
    wherein the controllable dithering means comprise a mirror disposed in a path of the optical writing beam.

9. An apparatus as claimed in claim 8, wherein the mirror is mounted on a galvanometer which is modulated to generate the dithering of the angle of incidence of the writing radiation beam.

10. An apparatus as claimed in claim 8, wherein the modulation means comprise a phase mask proximate the optical medium and generally parallel to the waveguiding axis, the phase mask generating the interference pattern.

11. An apparatus as claimed in claim 10, wherein the phase mask is translatable by the translating means jointly with the optical medium.

* * * * *